US012398687B2

(12) United States Patent
Matsumoto

(10) Patent No.: US 12,398,687 B2
(45) Date of Patent: Aug. 26, 2025

(54) ENGINE CONTROL DEVICE AND ENGINE CONTROL METHOD

(71) Applicant: ISUZU MOTORS LIMITED, Yokohama (JP)

(72) Inventor: Atsushi Matsumoto, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/610,013

(22) Filed: Mar. 19, 2024

(65) Prior Publication Data

US 2024/0328379 A1 Oct. 3, 2024

(30) Foreign Application Priority Data

Mar. 27, 2023 (JP) ................................ 2023-049712

(51) Int. Cl.
*F02M 19/02* (2006.01)
*F02M 59/36* (2006.01)
*F02M 63/02* (2006.01)

(52) U.S. Cl.
CPC ...... *F02M 63/0225* (2013.01); *F02M 59/366* (2013.01)

(58) Field of Classification Search
CPC ......... F02M 39/005; F02M 2041/1444; F02M 63/0265; F02M 37/06; F02D 2009/0245; B60K 25/02; B60K 25/022; B60K 25/024
USPC .................................. 123/198 DB, 325, 446
See application file for complete search history.

(56) References Cited

U.S. PATENT DOCUMENTS 1,166,937 A * 1/1916 Roesti ....................... F02B 1/12 123/27 R
5,042,445 A * 8/1991 Peters .................. F02M 57/021 123/446
2005/0247495 A1* 11/2005 Tabata .................. B60K 6/547 180/65.235
2006/0157023 A1* 7/2006 Matsuki ................ F02N 99/002 123/179.5
2011/0005474 A1* 1/2011 Carlson ..................... F01P 5/12 123/41.1
2012/0088631 A1* 4/2012 Zhang ................... F02N 11/084 477/52
2016/0222934 A1* 8/2016 Oki ...................... F02M 59/025

FOREIGN PATENT DOCUMENTS

JP 5898432 U * 7/1983
JP S58-98432 U 7/1983
JP 11147424 A * 6/1999 ........... B60H 1/3222
JP H11-147424 A 6/1999
JP 2004263669 A * 9/2004
JP 2006-348908 A 12/2006

(Continued)

*Primary Examiner* — Logan M Kraft
*Assistant Examiner* — Joshua Campbell
(74) *Attorney, Agent, or Firm* — PROCOPIO, CORY, HARGREAVES & SAVITCH LLP

(57) ABSTRACT

The engine control device includes: an injection control part that receives an instruction to stop an engine and stops injection of fuel from an injector into the engine; and a pumping control part that causes fuel to be pumped from a fuel pump that is driven by rotational motion of a crankshaft occurring from when injection of fuel has been stopped to when the rotation of the crankshaft stops, to a common rail that supplies fuel to the injector.

9 Claims, 3 Drawing Sheets

(56) References Cited

FOREIGN PATENT DOCUMENTS

| | | | | | |
|---|---|---|---|---|---|
| JP | 2007-071119 | A | | 3/2007 | |
| JP | 2009235990 | A | * | 10/2009 | |
| JP | 2011132872 | A | * | 7/2011 | ........... F02D 41/065 |
| JP | 2019138226 | A | * | 8/2019 | |
| JP | 2019-218936 | A | | 12/2019 | |

* cited by examiner

ENGINE CONTROL DEVICE AND ENGINE CONTROL METHOD

CROSS-REFERENCE TO RELATED APPLICATIONS

The present application claims priority to Japanese Patent Application number 2023-049712, filed on Mar. 27, 2023, contents of which are incorporated herein by reference in its entirety.

BACKGROUND OF THE INVENTION

The present disclosure relates to an engine control device and an engine control method.

When an engine stop condition is satisfied, a conventional vehicle control device stops fuel supply to the engine (a so-called fuel cut) after fuel has been pumped from a fuel pump to a common rail (e.g., Japanese Unexamined Patent Application Publication No. 2019-218936).

During engine restart, fuel is pumped to reach the desired fuel pressure in the common rail. Consequently, energy equivalent to the amount of work required to pump fuel is necessary during engine restart.

BRIEF SUMMARY OF THE INVENTION

The present disclosure has been made in view of these points, and its object is to reduce the amount of work required for fuel pumping during engine restart.

An engine control device according to a first aspect of the present disclosure includes: an injection control part that receives an instruction to stop an engine and stops injection of fuel from an injector into the engine; and a pumping control part that causes the fuel to be pumped from a fuel pump that is driven by rotational motion of the crankshaft occurring from when the injection of the fuel has been stopped to when rotation of the crankshaft stops, to a common rail that supplies the fuel to the injector.

An engine control method according to a second aspect of the present disclosure, executed by a computer, includes the steps of: receiving an instruction to stop an engine and therefore stopping injection of fuel from an injector into the engine, and causing the fuel to be pumped from a fuel pump that is driven by rotational motion of a crankshaft occurring from when the injection of the fuel has been stopped to when rotation of the crankshaft stops, to a common rail that supplies the fuel to the injector.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration of the Engine Control System S

Figure 1:
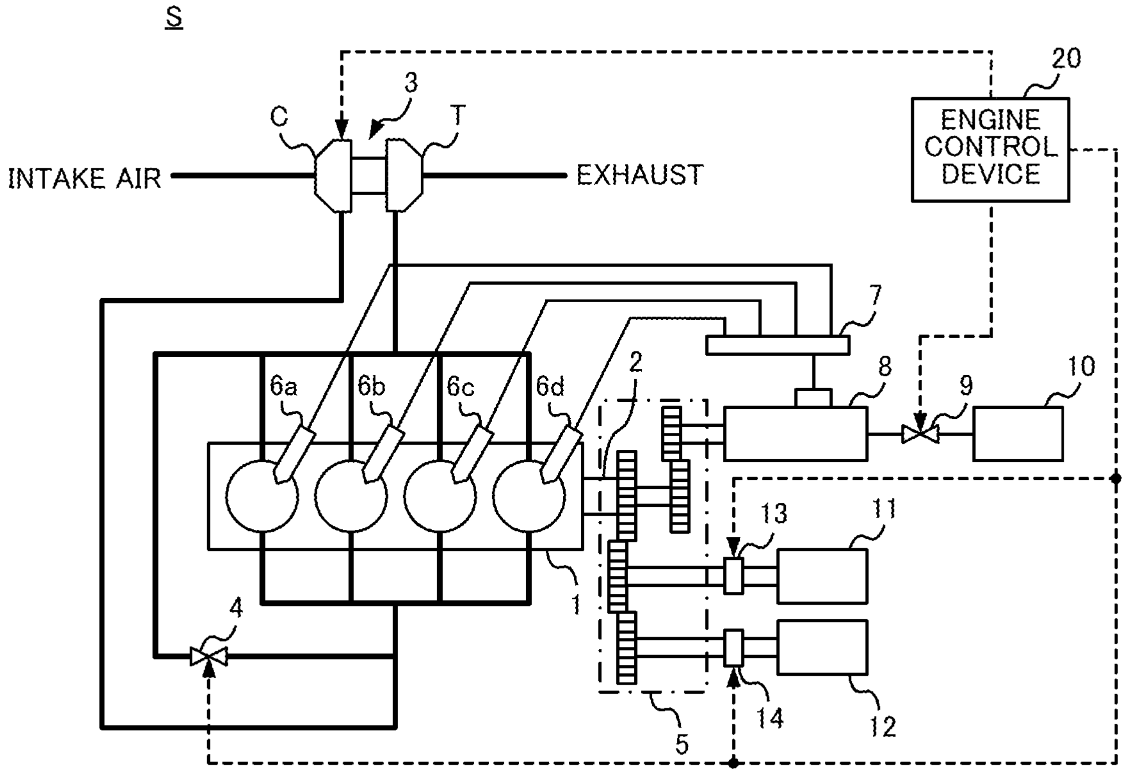
FIG. 1 is a diagram showing a configuration of an engine control system S according to the present embodiment.

FIG. 1 is a diagram showing a configuration of an engine control system S according to the present embodiment. The engine control system S shown in FIG. 1 includes an engine 1, a crankshaft 2, a supercharger 3, an Exhaust Gas Recirculation (EGR) valve 4, a group of gears 5, an injector **6*a*, an injector 6*b*, an injector 6*c*, an injector 6*d*, a common rail 7, a fuel pump 8, a regulating valve 9, a fuel tank 10, an oil pump 11, a water pump 12, a clutch 13, a clutch 14, and an engine control device 20**.

The engine control system S has a function of pumping fuel from the fuel pump 8 to the common rail 7 using the rotational kinetic energy of the crankshaft 2 included in the engine 1 when the engine 1 stops.

The engine 1 is an internal combustion engine that generates power by combusting and expanding a mixture of fuel and intake air (air). The crankshaft 2 is a shaft for changing reciprocating motion of a piston (not shown) in the engine into rotational motion. When the engine 1 stops, the crankshaft 2 generates rotational kinetic energy by rotating from a timing at which the injector 6 has stopped injecting fuel to a timing at which the engine 1 stops due to friction of a sliding portion of the engine 1 and pumping loss.

The supercharger 3 is a turbocharger, for example, and uses a flow of exhaust to increase the density of intake air. The supercharger 3 includes a turbine T provided in an exhaust passage and a compressor C provided in an intake passage. The turbine T rotates due to exhaust flowing through the exhaust passage. The compressor C is connected to the turbine T via a connecting shaft, and compresses intake air by rotating together with the turbine T. The EGR valve 4 is a valve provided in an EGR passage. In the EGR passage, the opening degree of the EGR valve 4 is controlled, thereby adjusting the amount of EGR gas.

The group of gears 5 is configured with a plurality of gears having a plurality of irregularities on their outer peripheries, and includes a ring gear attached to the crankshaft 2. A plurality of other gears that are included in the group of gears 5 and different from the ring gear rotate due to irregularities on their outer peripheries meshing with irregularities on the outer periphery of the ring gear, and transmit rotational kinetic energy generated by the crankshaft 2 to the fuel pump 8, the oil pump 11, and the water pump 12.

The injector **6*a*, the injector 6*b*, the injector 6*c*, and the injector 6*d* (which may be referred to hereinafter as "the injectors 6") inject fuel sent from the common rail 7 into a combustion chamber in the engine 1. The common rail 7 stores fuel pumped by the fuel pump 8 in a high-pressure state. The fuel pump 8 is a pump that pumps fuel in the fuel tank 10 to the common rail 7, and is driven by rotational kinetic energy generated by the crankshaft 2. The regulating valve 9 is an open/close valve for controlling the amount of fuel pumped by the fuel pump 8 and is provided upstream of the fuel pump 8 and downstream of the fuel tank 10. The fuel tank 10 is a tank storing fuel pumped by the fuel pump 8**.

The oil pump 11 is a pump for pumping up engine oil accumulated in a lower portion of the engine 1 (i.e., an oil pan) and circulating the engine oil through the engine 1. The water pump 12 is a pump for circulating cooling water for cooling the engine 1. The clutch 13 is a clutch that connects the crankshaft 2 and the oil pump 11 via gears included in the group of gears 5, and the clutch 14 is a clutch that connects the crankshaft 2 and the water pump 12 via gears included in the group of gears 5.

By adjusting the opening degree of the regulating valve 9, the engine control device 20 performs processing for causing the fuel pump 8 to pump fuel such that the pressure of fuel in the common rail 7 reaches a desired value. The engine control device 20 causes the fuel pump 8 to pump fuel by adjusting the opening degree of the regulating valve 9 in accordance with the pressure of the fuel in the common rail 7 detected by a pressure sensor (not shown) provided in the common rail 7 (i.e., so as to keep the pressure of the fuel in the common rail 7 high), for example. The engine control device 20 may have a housing including electronic components, or may be a printed circuit board on which electronic components are mounted.

During restart of the engine 1, if the pressure of the fuel in the common rail 7 has not reached the desired value, the amount of work required for the fuel pump 8 to pump fuel increases. Accordingly, the engine control device 20 causes fuel to be pumped from the fuel pump 8 to the common rail 7 during stoppage of the engine 1, which is prior to restart of the engine 1. For example, the engine control device 20 drives the fuel pump 8 with rotational motion of the crankshaft 2 occurring from when the injector 6 has stopped injecting fuel to when the rotation of the crankshaft 2 stops, thereby causing fuel to be pumped from the fuel pump 8 to the common rail 7.

The engine control device 20 operating in this manner keeps the pressure of the fuel in the common rail 7 high even though the engine 1 is stopped, making it possible to reduce the amount of work required for the fuel pump 8 to pump fuel during restart of the engine 1.

Hereinafter, a configuration and operation of the engine control device 20 will be described in detail.

<Configuration of the Engine Control Device 20>

Figure 2:
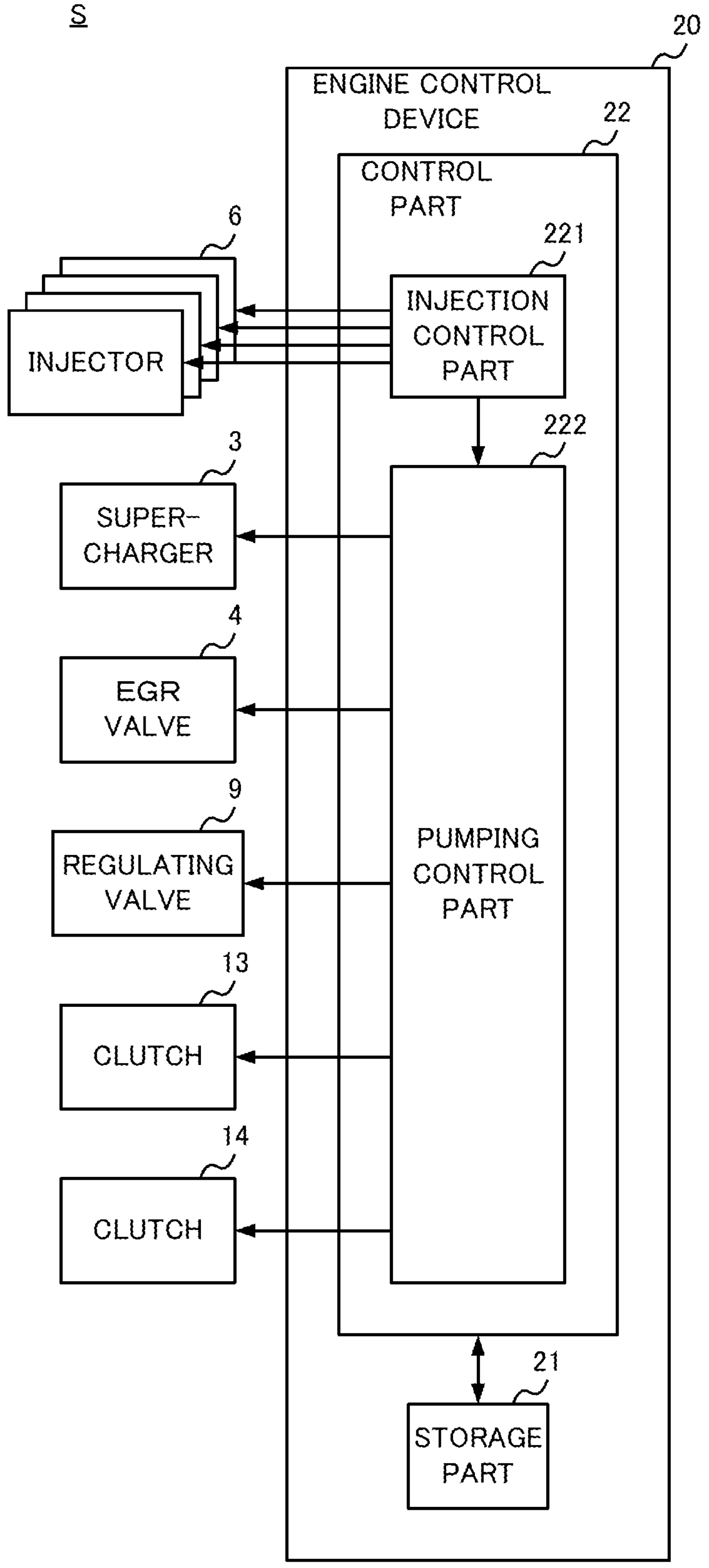
FIG. 2 is a diagram showing a configuration of an engine control device 20.

FIG. 2 is a diagram showing a configuration of the engine control device 20. The engine control device 20 includes a storage part 21 and a control part 22. The control part 22 includes an injection control part 221 and a pumping control part 222.

The storage part 21 includes a storage medium such as a Read Only Memory (ROM), a Random Access Memory (RAM), a Hard Disk Drive (HDD), or a Solid State Drive (SSD). The storage part 21 stores a program executed by the control part 22. The storage part 21 stores various types of information for causing the fuel pump 8 to pump fuel when the engine 1 is stopped.

The control part 22 is a processor such as a Central Processing Unit (CPU) or an Electronic Control Unit (ECU), for example. The control part 22 functions as the injection control part 221 and the pumping control part 222 by executing a program stored in the storage part 21. It should be noted that the control part 22 may be configured by a single processor, or may be configured by a plurality of processors or a combination of one or more processors and an electronic circuit.

Configurations of each part implemented by the control part 22 will be described below.

The injection control part 221 receives an instruction to stop the engine 1, and stops injection of fuel from the injector 6 into the engine 1 (i.e., performs a so-called fuel cut). The injection control part 221 receives an instruction to start or stop driving of the engine 1 and controls injection of fuel from the injector 6 into the engine 1. Further, the injection control part 221 receives an instruction related to the amount of fuel to be injected or an injection timing in accordance with a driving condition of the engine 1, and controls injection of fuel from the injector 6 into the engine 1. The injection control part 221 may receive the above-described instruction related to driving of the engine 1 from a processor such as an external ECU, or from the control part 22. The injection control part 221 notifies the pumping control part 222 that injection of fuel from the injector 6 has been stopped.

The pumping control part 222 causes fuel to be pumped, to the common rail 7 that supplies fuel to the injector 6, from the fuel pump 8 that is driven by rotational motion of the crankshaft 2 occurring from a timing at which injection of fuel is stopped (fuel cut) to a timing at which the rotation of the crankshaft 2 stops. That is, the pumping control part 222 drives the fuel pump 8 with rotational motion of the crankshaft 2 to cause fuel to be pumped from the fuel pump 8 to the common rail 7, from when fuel cut was started until the time when the rotation of the crankshaft 2 has stopped.

For example, the pumping control part 222 adjusts the opening degree of the regulating valve 9 and controls the amount of fuel to be pumped from the fuel tank 10 from when fuel cut was started until the time when the rotation of the crankshaft 2 has stopped, thereby causing fuel to be pumped from the fuel pump 8 to the common rail 7. The pumping control part 222 opens the regulating valve 9 to an opening degree corresponding to the amount of fuel to be pumped for causing the pressure of the fuel in the common rail 7 to reach the desired pressure, thereby causing fuel to be pumped from the fuel pump 8 to the common rail 7. When the engine 1 is stopped, the pumping control part 222 operating in this manner makes it possible to increase the pressure of the fuel in the common rail 7 using the rotational kinetic energy of the crankshaft 2 after the fuel cut. As a result, the engine control device 20 can reduce the amount of work required for the fuel pump 8 to pump fuel during restart of the engine 1.

The engine 1 may be provided with one or more auxiliary machines. The auxiliary machine is at least one of the supercharger 3 or the EGR passage including the EGR valve 4, for example. When the auxiliary machine operates from when fuel cut was started until the time when the rotation of the crankshaft 2 has stopped, the resistance of the crankshaft 2 against the rotation increases. Accordingly, from when fuel cut was started until the time when the rotation of the crankshaft 2 has stopped, the pumping control part 222 causes fuel to be pumped to the common rail 7 from the fuel pump 8 that has been driven by rotational motion of the crankshaft 2, and controls the operation of the auxiliary machine so that the resistance caused by the operation of the auxiliary machine is reduced.

The pumping control part 222 opens the open/close valve provided to the supercharger 3, from when fuel injection was stopped until the rotation of the crankshaft 2 stops (i.e., the start of the fuel cut), for example. The open/close valve is a wastegate valve or a nozzle vane provided in the turbine T, for example. The pumping control part 222 operating in this manner can reduce the resistance caused by the operation of the supercharger 3, so that the pumping control part 222 can increase rotational kinetic energy used for fuel pumping by the fuel pump 8.

The pumping control part 222 may reduce the resistance against the rotation of the crankshaft 2 and cause fuel to be pumped from the fuel pump 8 to the common rail 7 by causing exhaust to flow into the EGR passage from when the fuel cut was started until the rotation of the crankshaft 2 stops. The pumping control part 222 opens the EGR valve 4 provided in the EGR passage from when the fuel cut was started until the rotation of the crankshaft 2 stops, to cause exhaust to flow into the EGR passage, for example. The pumping control part 222 operating in this manner can reduce the resistance against the rotation of the crankshaft 2 by causing exhaust to flow into the EGR passage, making it possible to increase rotational kinetic energy used for fuel pumping by the fuel pump 8.

Further, the oil pump 11 and the water pump 12 are connected to the crankshaft 2 included in the engine 1, via the group of gears 5. When the oil pump 11 and the water pump 12 use rotational kinetic energy from when fuel cut was started until the time when the rotation of the crankshaft 2 has stopped, the rotational kinetic energy used for the fuel pump 8 becomes small, so that the amount of fuel pumped by the fuel pump 8 becomes small. Accordingly, the pumping control part 222 controls the oil pump 11 and the water pump 12 not to operate from when the fuel cut was started until the time when the rotation of the crankshaft 2 stops.

The pumping control part 222 disengages a clutch connecting the crankshaft 2 and the auxiliary machine that can be driven by rotational motion of the crankshaft 2, from when the fuel cut was started until the rotation of the crankshaft 2 stops, for example. Specifically, the pumping control part 222 disengages the clutch 13 connecting the oil pump 11 and the crankshaft 2, and the clutch 14 connecting the water pump 12 and the crankshaft 2.

The pumping control part 222 disengages each of a plurality of clutches (e.g., the clutch 13 and the clutch 14) connecting a plurality of auxiliary machines (e.g., the oil pump 11 and the water pump 12) and the crankshaft 2 at a timing at which fuel injection has been stopped (i.e., a timing at which the fuel cut has been started), for example.

The pumping control part 222 disengages the clutch 13 connecting the crankshaft 2 and the oil pump 11 that pumps up engine oil accumulated in the lower portion of the engine 1 to circulate the engine oil through the engine 1, at a timing at which fuel injection has been stopped, for example. The pumping control part 222 disengages the clutch 14 connecting the crankshaft 2 and the water pump 12 that circulates cooling water for cooling the engine 1, at a timing at which fuel injection has been stopped, for example. The pumping control part 222 operating in this manner increases the rotational kinetic energy that can be used by the fuel pump 8 within the rotational kinetic energy of the crankshaft 2, making it possible to increase the amount of fuel pumped by the fuel pump 8.

When the pressure of fuel in the common rail 7 reaches the desired pressure, from when the pumping control part 222 started the fuel cut until the time when the rotation of the crankshaft 2 stops, the pumping control part 222 may engage each of the clutch 13 and the clutch 14 to resume the operation of the oil pump 11 and the water pump 12.

For example, when the pressure of the fuel in the common rail 7 has reached the desired pressure, from when injection of fuel was stopped until the time when the rotation of the crankshaft 2 stops, the pumping control part 222 engages each of the plurality of clutches connecting the crankshaft 2 and the plurality of auxiliary machines that can be driven by rotational motion of the crankshaft 2. The plurality of auxiliary machines are the oil pump 11 and the water pump 12, and the plurality of clutches are the clutch 13 and the clutch 14, for example. Specifically, when the pressure of the fuel in the common rail 7 has reached the desired pressure, from when injection of fuel was stopped until the time when the rotation of the crankshaft 2 stops, the pumping control part 222 engages the clutch 13 connecting the oil pump 11 and the crankshaft 2 and engages the clutch 14 connecting the water pump 12 and the crankshaft 2, for example. The pumping control part 222 operating in this manner enables the rapid performance of cooling of the engine 1 after stoppage of driving.

<Processing Sequence in the Engine Control Device>

Figure 3:
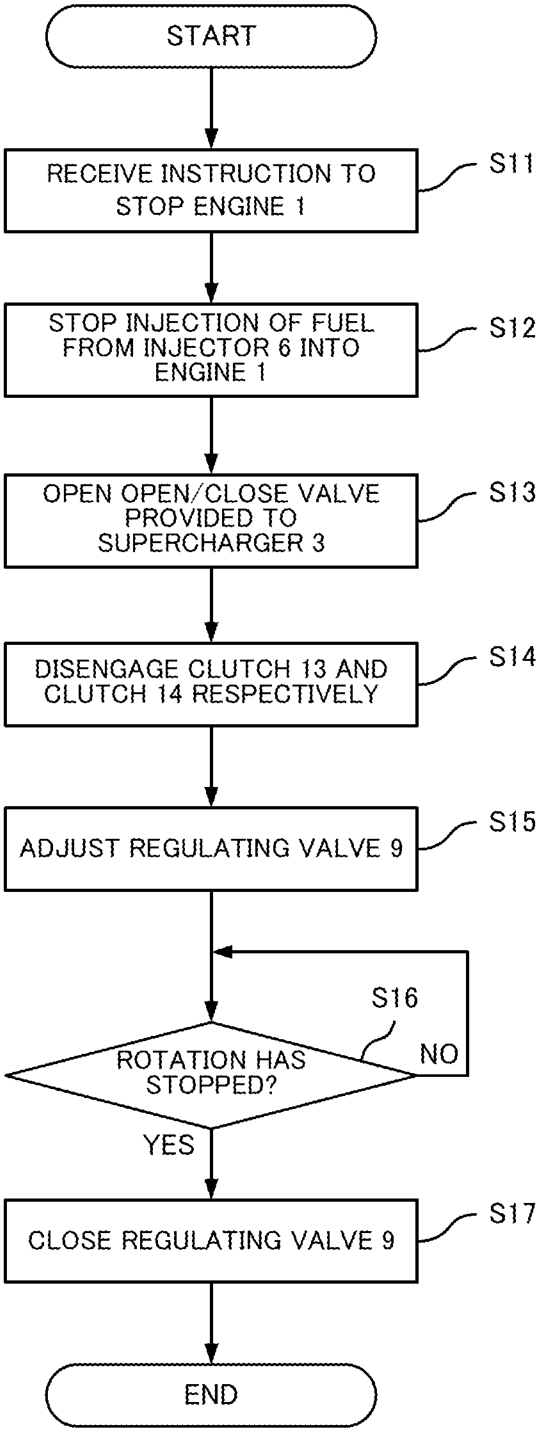
FIG. 3 is a diagram showing an example of a processing sequence in the engine control device 20.

FIG. 3 is a diagram showing an example of a processing sequence in the engine control device 20. The processing sequence shown in FIG. 3 shows an operation of the fuel pump 8 to pump fuel to the common rail 7, from when fuel cut was started until the time when the rotation of the crankshaft 2 stops.

The injection control part 221 receives an instruction to stop the engine 1 (S11), and stops injection of fuel from the injector 6 into the engine 1 (S12). The pumping control part 222 opens the open/close valve provided to the supercharger 3 (S13), and disengages the clutch 13 and the clutch 14 respectively connecting the oil pump 11 and the water pump 12 to the crankshaft 2 (S14). The pumping control part 222 adjusts the opening degree of the regulating valve 9 (S15). The pumping control part 222 causes the fuel pump 8 to pump fuel by opening the regulating valve 9 to an opening degree corresponding to the amount of fuel to be pumped for causing the pressure of the fuel in the common rail 7 to reach the desired pressure, for example.

Subsequently, the pumping control part 222 determines whether or not the rotation of the crankshaft 2 has stopped (S16). The pumping control part 222 determines whether or not the rotation of the crankshaft 2 has stopped by acquiring the rotational speed of the engine 1 from an external ECU or the control part 22, for example. If the rotation of the crankshaft 2 has not stopped ("NO" in S16), the pumping control part 222 determines that the fuel pump 8 is pumping fuel, and repeats the processing of step S16. If the rotation of the crankshaft 2 has stopped ("YES" in S16), the pumping control part 222 determines that fuel pumping by the fuel pump 8 has stopped, and closes the regulating valve 9 (S17).

<Effect of the Engine Control Device 20>

As described above, the engine control device 20 includes: the injection control part 221 that receives an instruction to stop the engine 1 and stops injection of fuel from the injector 6 into the engine 1; and the pumping control part 222 that causes fuel to be pumped, to the common rail 7 that supplies fuel to the injector 6, from the fuel pump 8 that is driven by rotational motion of the crankshaft 2 occurring from when fuel injection has been stopped to when the rotation of the crankshaft 2 stops.

The engine control device 20 configured in this manner can increase the pressure of the fuel in the common rail 7 when the engine 1 is stopped, so that the engine control device 20 can reduce the amount of work required for the fuel pump 8 to pump fuel during restart of the engine 1. Further, since the engine control device 20 uses the rotational kinetic energy of the crankshaft 2 occurring from when fuel cut has been started to when the rotation of the crankshaft 2 stops, to cause fuel to be pumped from the fuel pump 8, the engine control system S can effectively utilize the rotational kinetic energy of the crankshaft 2 after the fuel cut.

What is claimed is:

1. An engine control device comprising:

a processor coupled to a memory storing instructions for the processor to function as:

an injection control part that receives an instruction to stop an engine and stops injection of fuel from an injector into the engine; and a pumping control part that causes the fuel to be pumped from a fuel pump that is driven by rotational motion of a crankshaft occurring from when the injection of the fuel has been stopped to when rotation of the crankshaft stops, to a common rail that supplies the fuel to the injector, wherein the pumping control part, during a period from when the injection of the fuel is stopped until the rotation of the crankshaft stops, engages each of a plurality of clutches, provided between a gear included in a gear group which includes a ring gear mounted on the crankshaft and a plurality of auxiliary machines that can be driven by the rotational motion of the crankshaft, after having disengaged each of the clutches, in a case where a pressure of the fuel in the common rail has reached a desired pressure.

2. The engine control device according to claim 1, wherein the pumping control part adjusts an opening degree of a regulating valve provided upstream of the fuel pump to control an amount of the fuel to be pumped.

3. The engine control device according to claim 1, wherein the pumping control part opens an open/close valve provided to a supercharger, from when the injection of the fuel was stopped until the rotation of the crankshaft stops.

4. The engine control device according to claim 1, wherein the pumping control part reduces resistance against the rotation of the crankshaft by causing exhaust to flow into an Exhaust Gas Recirculation (EGR) passage, and causes the fuel to be pumped from the fuel pump to the common rail from when the injection of the fuel was stopped until the rotation of the crankshaft stops.

5. The engine control device according to claim 4, wherein the pumping control part opens a valve provided in the EGR passage, from when the injection of the fuel was stopped until the rotation of the crankshaft stops, to cause the exhaust to flow into the EGR passage.

6. The engine control device according to claim 1, wherein the pumping control part disengages clutches connecting the crankshaft and an auxiliary machine of the auxiliary machines that can be driven by the rotational motion of the crankshaft, from when the injection of the fuel was stopped until the rotation of the crankshaft stops.

7. The engine control device according to claim 6, wherein the pumping control part disengages a clutch connecting the crankshaft and an oil pump that pumps up engine oil accumulated in a lower portion of the engine and circulates the engine oil through the engine, and disengages a clutch connecting the crankshaft and a water pump that circulates cooling water for cooling the engine, at a timing at which the injection of the fuel has been stopped.

8. The engine control device according to claim 6, wherein when a pressure of the fuel in the common rail has reached a desired pressure, from when the injection of the fuel was stopped until a time when the rotation of the crankshaft stops, the pumping control part engages the clutch connecting the crankshaft and an oil pump that pumps up engine oil accumulated in a lower portion of the engine and circulates the engine oil through the engine, and engages the clutch connecting the crankshaft and a water pump that circulates cooling water for cooling the engine.

9. An engine control method, executed by a computer, comprising:

receiving an instruction to stop an engine and therefore stopping injection of fuel from an injector into the engine;

causing the fuel to be pumped from a fuel pump that is driven by rotational motion of a crankshaft occurring from when the injection of the fuel has been stopped to when rotation of the crankshaft stops, to a common rail that supplies the fuel to the injector; and after the causing of the fuel to be pumped, engaging each of a plurality of clutches provided between a gear included in a gear group including a ring gear mounted on the crankshaft and a plurality of auxiliary machines that can be driven by the rotational motion of the crankshaft, connecting the plurality of the auxiliary machines to the crankshaft when a pressure of the fuel in the common rail has reached a desired pressure after disengaging each of the plurality of the clutches, from when the injection of the fuel was stopped until a time when the rotation of the crankshaft stops.

* * * * *